(12) United States Patent
Hall et al.

(10) Patent No.: US 8,590,841 B1
(45) Date of Patent: Nov. 26, 2013

(54) HOISTING SYSTEMS AND METHODS

(75) Inventors: Richard Hall, Athens, AL (US);
Michael Katchur, Huntsville, AL (US);
Troy Jarrell, Athens, AL (US)

(73) Assignee: WestWind Technologies, Inc., Huntsville, AL (US)

( * ) Notice: Subject to any disclaimer, the term of this patent is extended or adjusted under 35 U.S.C. 154(b) by 287 days.

(21) Appl. No.: 13/033,291

(22) Filed: Feb. 23, 2011

Related U.S. Application Data

(60) Provisional application No. 61/307,259, filed on Feb. 23, 2010.

(51) Int. Cl.
*B64C 1/22* (2006.01)
(52) U.S. Cl.
USPC ..................................................... 244/137.1
(58) Field of Classification Search
USPC ......... 212/301, 180, 181, 179, 312, 313, 324, 212/76, 97, 336, 271; 414/589, 590; 244/137.1, 2, 115
See application file for complete search history.

(56) References Cited

U.S. PATENT DOCUMENTS

| | | | |
|---|---|---|---|
| 2,950,073 A * | 8/1960 | McLain et al. | 244/137.1 |
| 6,334,590 B1 * | 1/2002 | Landry | 244/137.1 |
| 8,490,923 B2 * | 7/2013 | Bosqueiro et al. | 244/137.1 |
| 2011/0147531 A1 * | 6/2011 | Bosqueiro et al. | 244/137.1 |

FOREIGN PATENT DOCUMENTS

DE        3323513 A1 *  1/1985

* cited by examiner

*Primary Examiner* — Joseph W Sanderson
*Assistant Examiner* — Brian M O'Hara
(74) *Attorney, Agent, or Firm* — Ann I. Dennen; Lanier Ford Shaver & Payne P.C.

(57) ABSTRACT

Embodiments of the present disclosure generally pertain to hoisting systems and methods for vehicles, such as UH-60 Black Hawk helicopters ("Black Hawks"). An external hoist arm system in accordance with an exemplary embodiment of the present disclosure is configured to be temporarily mounted to the outside of a vehicle. The hoist arm system is further configured to support a hoist and position the hoist above an external door of the vehicle. A rotatable adjustment member is used to adjust an angular position of the hoist relative to the vehicle.

13 Claims, 9 Drawing Sheets

HOISTING SYSTEMS AND METHODS

CROSS REFERENCE TO RELATED APPLICATION

This application claims priority to U.S. provisional patent application No. 61/307,259, entitled "Hoisting Systems and Methods" and filed on Feb. 23, 2010, which is incorporated herein by reference.

RELATED ART

Vehicles, such as UH-60 Black Hawk helicopters ("Black Hawks"), are used in a wide variety of missions, such as military combat missions, transportation of troops, and Search and Rescue ("SAR") missions. Many vehicles, particularly Black Hawks, have structurally sound points, known as External Stores Support System ("ESSS") hard points, located on the outside of the vehicle which allow the vehicle to carry additional external fuel tanks or various weapon systems. In order to facilitate rescues in SAR missions, a rescue hoist assembly is oftentimes permanently mounted above a vehicle's external door. Rescue crews are trained on such permanent rescue hoist assemblies.

While such permanent hoist assemblies are useful for SAR missions, they have certain drawbacks. One drawback of a permanent hoist assembly is aerodynamic drag on the vehicle created by the assembly. Such drag takes place even during missions unrelated to SAR missions due to the inability to remove the permanent hoist assembly. Another drawback is the weight of the permanent hoist assembly, which is carried at all times by the vehicle and permanently increases the payload of the vehicle, reducing the amount of cargo and/or number of passengers the vehicle can transport. Furthermore, installing a permanent external hoist assembly is time-consuming and oftentimes cost-prohibitive due to the length of time the vehicle must be out of service while the assembly is installed.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to hoisting systems and methods for vehicles, such as UH-60 Black Hawk helicopters ("Black Hawks"). An external hoist arm system in accordance with an exemplary embodiment of the present disclosure is configured to be temporarily mounted to the outside of a vehicle. The hoist arm system is further configured to support a hoist and position the hoist above an external door of the vehicle.

Figure 1:
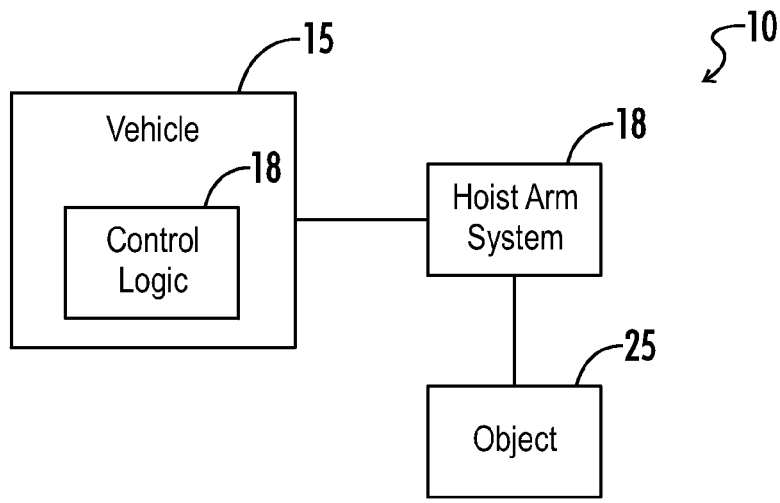
FIG. 1 is a block diagram illustrating an exemplary embodiment of a hoisting system.

FIG. 1 depicts an exemplary hoisting system 10. The hoisting system 10 comprises a vehicle 15 having control logic 18. In one embodiment, the vehicle 15 is a Black Hawk, but other types of vehicles are possible in other embodiments. The hoisting system 10 further comprises a hoist arm system 21 externally mounted to a fuselage 22 (FIG. 3) of the vehicle 15, and the control logic 18 is configured to control the operation of the hoist arm system 21. The hoist arm system 21 is configured to facilitate the raising and lowering of an object 25 to and from the vehicle 15 during various missions, such as, for example, SAR missions. Thus, the control logic 18 controls the raising and lowering the object 25 by the hoist arm system 21. In one embodiment, the object 25 comprises a basket or other container for carrying ammunitions, weapons, supplies, or people, but other types of objects may be hoisted by the system 10 in other embodiments.

It should be noted that the control logic 18 can be implemented in software, hardware, firmware or any combination thereof. In one embodiment, the control logic 18 is implemented through an analog processor, such as, for example, a microcontroller. Alternatively, in an exemplary embodiment illustrated in FIG. 2, the control logic 18 is implemented in software and stored in memory 28 of a computer system 30.

Note that the control logic 18, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Figure 2:
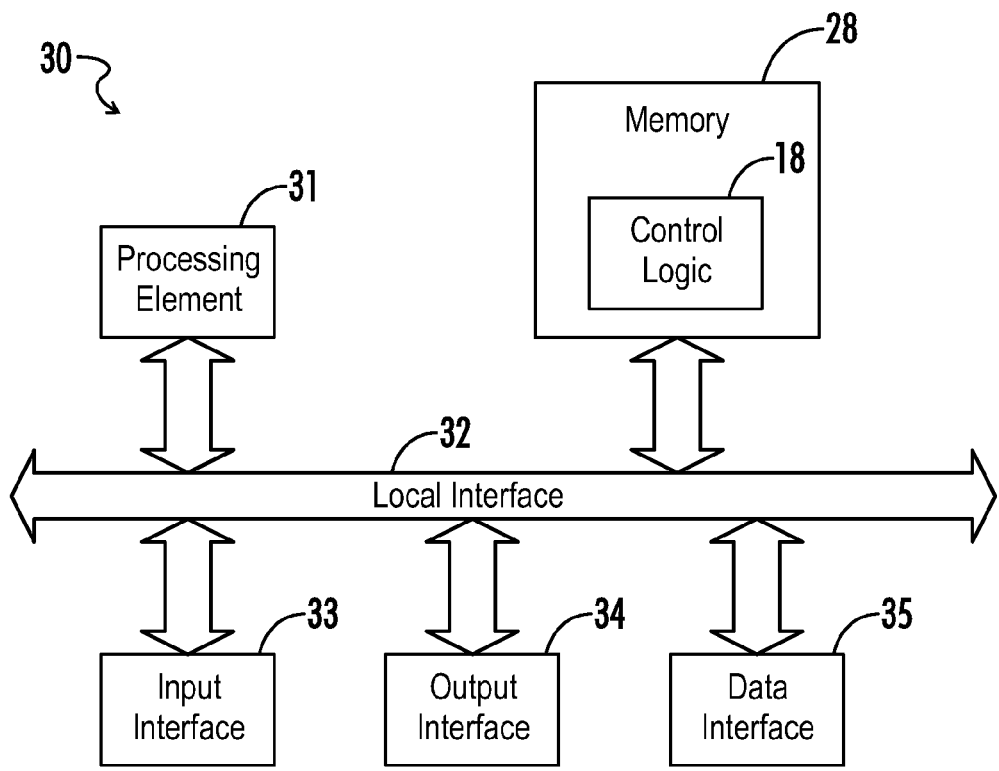
FIG. 2 is a block diagram illustrating an exemplary embodiment of a computer system for controlling operation of the hoisting system depicted by FIG. 1.

The exemplary embodiment of the computer system 30 depicted by FIG. 2 comprises at least one conventional processing element 31, such as a digital signal processor (DSP) or a central processing unit (CPU), that communicates to and drives the other elements within the system 30 via a local interface 32, which can include at least one bus. Furthermore, an input interface 33, for example, a keyboard or a mouse, can be used to input data from a user of the system 30, and an output interface 34, for example, a printer or monitor, can be used to output data to the user. Additionally, a data interface 35 can be used by the system 30 to exchange data with devices external to the system 30.

Figure 3:
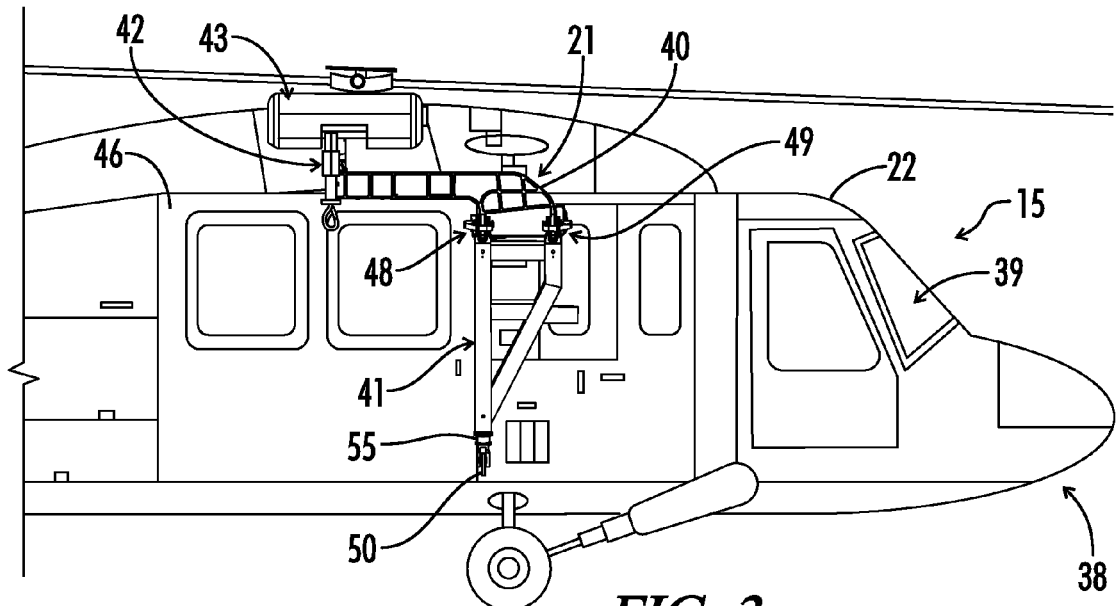
FIG. 3 is a side view illustrating an exemplary embodiment of an aerial vehicle on which a hoist arm system, such as is depicted by FIG. 1, is mounted.

FIG. 3 depicts a side view of an exemplary external hoist arm system 21 mounted to a vehicle 15. While the vehicle 15 illustrated in FIG. 3 is a Black Hawk helicopter, the external hoist arm system 21 can be implemented with other vehicles in other embodiments. The vehicle 15 has a leading end 38 at which the vehicle's cockpit 39 is located. During flight, the leading end 38 is the first portion of the fuselage 22 to encounter the oncoming airstreams induced by forward movement of the vehicle 15.

The external hoist arm system 21 comprises a hoist arm 40 mounted to a support frame assembly 41. An adapter mount 42, described in more detail hereafter, is mounted on an end of the hoist arm 40 and supports a hoist 43. The hoist 43 is positioned above a door 46 of the vehicle 15 and is configured to facilitate rescues in SAR missions by raising and lowering objects 25 (FIG. 1). The hoist arm 40 is mounted to upper External Stores Support System ("ESSS") hard points 48, 49, and the support frame assembly 41 comprises a rotatable adjustment member 55, which is mounted to a lower ESSS hard point 50. Thus, the hoist arm system 21 is mounted to the vehicle 15 at three ESSS hard points 48-50. As shown by FIG. 3, the hard points 48-50 are positioned adjacent to the door 46 between the door 46 and the leading end 38 of the fuselage 22.

Figure 13:
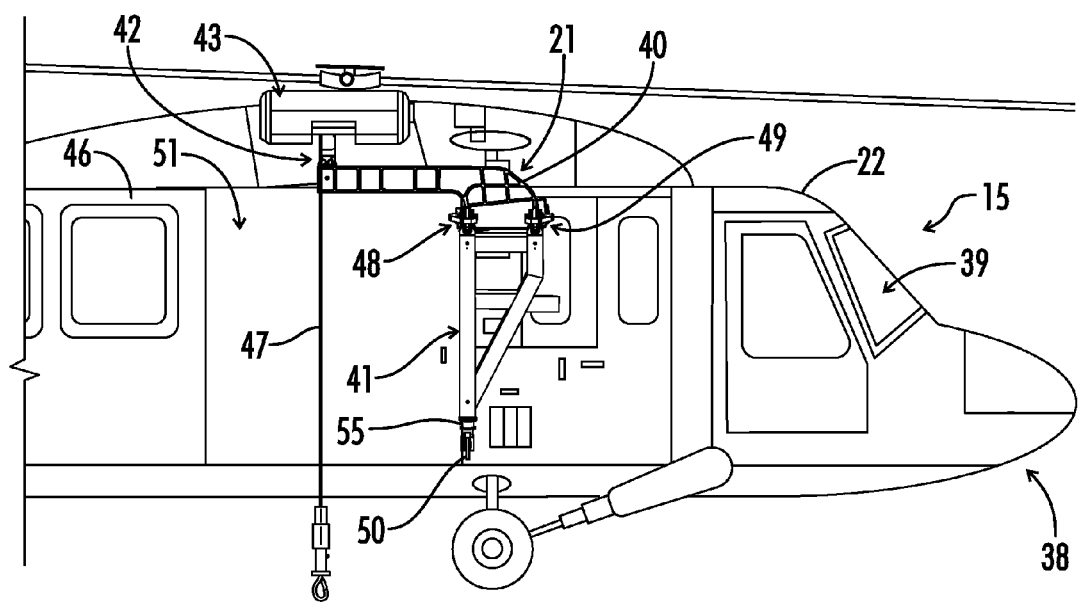
FIG. 13 is a side view illustrating the aerial vehicle of FIG. 3 after a door has been opened and a hoisting cable has been lowered by a hoist of the hoist arm system.

Positioning the hoist 43 above the door 46 generally facilitates the hoisting of objects to and from the entrance of the door 46. For example, FIG. 13 shows the vehicle 15 when the door 46 has been opened to expose a doorway 51, such as may be the case when the hoist 43 is being used to raise or lower objects. When the hoist 43 is positioned as shown, a hoisting cable 47 that is lowered and retracted by the hoist 43 is aligned with a doorway 51 for the door 46 such that objects being hoisted by the hoist 43 are raised directly to or from the doorway 51 facilitating entry or exit of the object to or from the vehicle 15. However, if desired the hoist 43 may be positioned at other locations in other embodiments.

Figure 4:
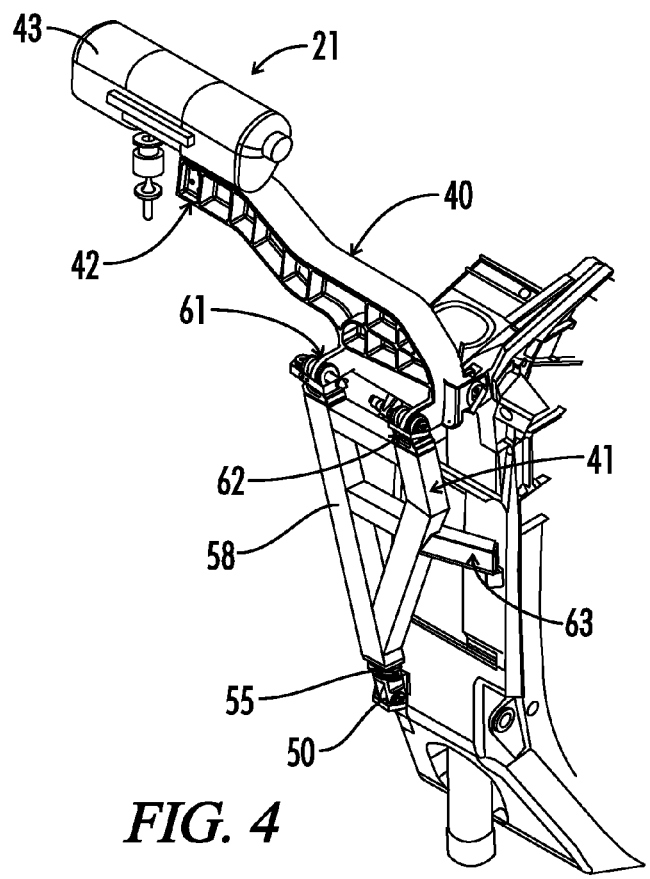
FIG. 4 depicts the exemplary external hoist arm system of FIG. 3 mounted to a vehicle.

FIG. 4 depicts an exemplary external hoist arm system 21 mounted to a vehicle 15. As described above, the hoist arm 40 is mounted to the upper ESSS hard points 48, 49 of the vehicle 15. The hoist arm 40 is also mounted to mounting brackets 61, 62 located on the top of the support frame 58 of the support frame assembly 41. The hoist arm 40 extends from the support frame assembly 41 toward the rear of the vehicle 15 above a door 46 on the side of the vehicle 15. The hoist arm 40 supports a hoist 43 directly above the door 46 in close proximity to where a hoist in a permanent hoist assembly would be positioned. Such placement of the hoist 43 allows rescue crews who are trained on permanent hoist assemblies to operate the hoist 43 without the need for further training.

The support frame assembly 41 comprises the rotatable adjustment member 55, a support frame 58, mounting brackets 61, 62 mounted to the top of the support frame 58, and a maintenance step 63 extending from the side of the support frame 58. The rotatable adjustment member 55 engages with the bottom of the support frame 58 by extending upward into the support frame 58. The rotatable adjustment member 55 is configured such that the angular position of the hoist 43 in relation to the door 46 is adjusted when the member 55 is rotated. In one exemplary embodiment, the outer surface at the top of the rotatable adjustment member 55 and the inner surface at the bottom of the support frame 58 are threaded in order to facilitate adjustment of the angular position of the hoist 43 in relation to the vehicle 15 when the member 55 is rotated. In one embodiment, the member 55 is configured such that one complete rotation of the member 55 adjusts the angular position of the hoist 43 with respect to the vehicle 15 by approximately one-fourth of an inch. Once the hoist 43 is in a desirable position in relation to the door 46, the member 55 is mounted to the lower ESSS hard point 50. The maintenance step 63 is positioned in such a way as to facilitate maintenance while the hoist arm system 21 is mounted on the vehicle 15. In this regard, a user may step on and be supported by the step 63 when performing maintenance.

Figure 5:
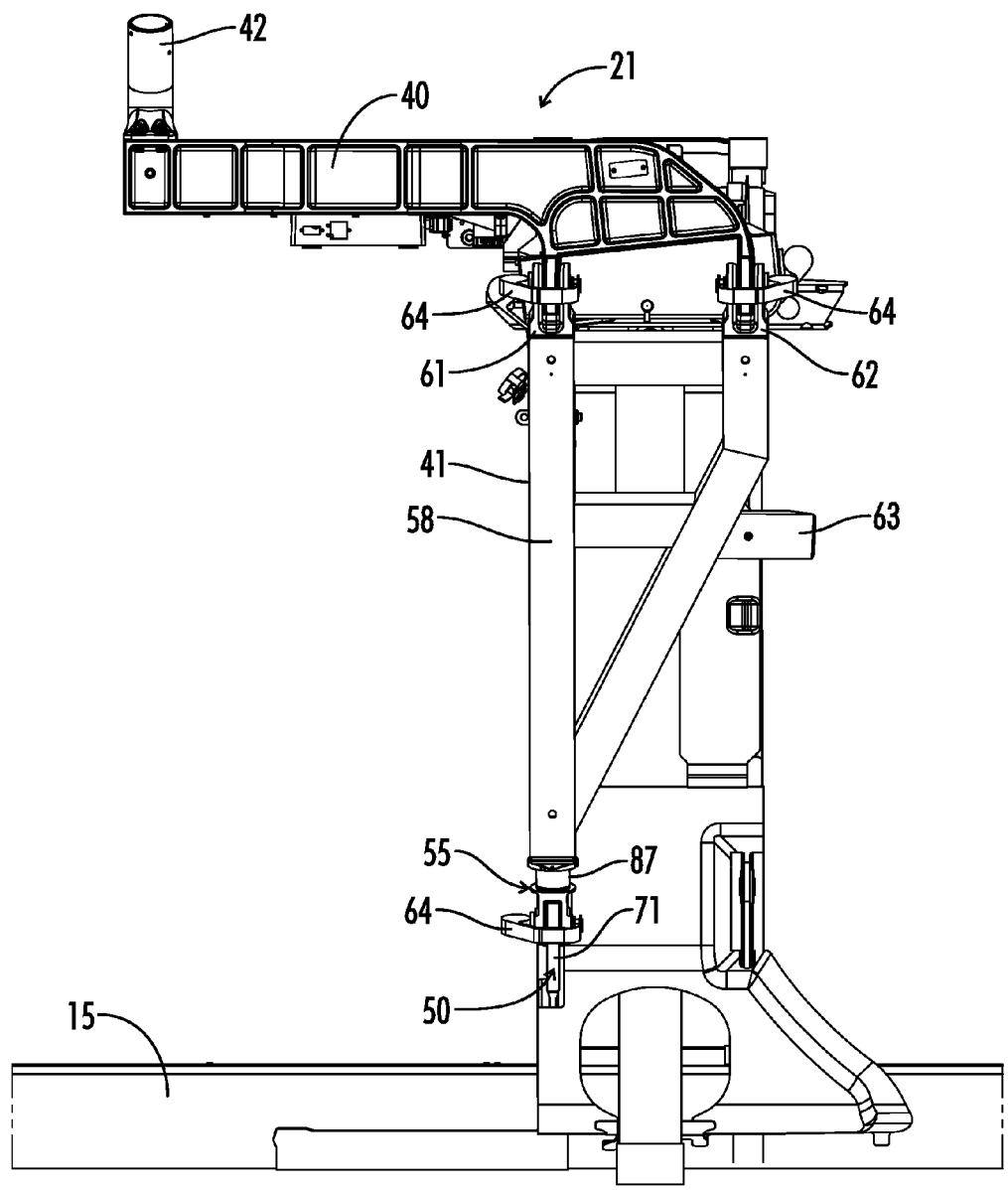
FIG. 5 is a side view of the exemplary external hoist arm system of FIG. 3 mounted to a vehicle.

FIG. 5 depicts a close view of the external hoist arm system 21 of FIG. 3 mounted to a vehicle 15. Notably, the hoist 43 (FIG. 3) is not mounted on the system 21 in FIG. 5. The system 21 comprises the adapter mount 42 mounted to the hoist arm 40, wherein the adapter mount 42 extends vertically from the arm 40. In one exemplary embodiment, the mount 42 is coupled to the hoist arm via a screw, but other techniques and devices may be used to couple the mount 42 to the hoist arm 40. The adapter mount 42 is configured to mate with the bottom of a hoist 43 (FIG. 3). The hoist arm 40 is mounted to the mounting brackets 61, 62 positioned on top of the support frame assembly 41, and to upper ESSS hard points 48, 49 (FIG. 3). The hoist arm 40 is coupled to the mounting brackets 61, 62 with expansion pins 64 extending through apertures (not shown) of the mounting brackets 61, 62 and the hoist arm 40.

The support frame assembly 41 comprises the support frame 58, the maintenance step 63 extending from the side of the support frame 58, and the rotatable adjustment member 55 engaged with the bottom of the support frame 58. When rotated, the rotatable adjustment member 55 adjusts the height of the support frame assembly 41, which in turn adjusts the angular position of the hoist arm 40 in relation to the vehicle 15. In particular, rotating the member 55 moves the support frame 58 up or down (depending on the direction of rotation) in the y-direction causing the frame 58 to pivot about expansion pins 64. Once adjustment of the hoist arm 40 is complete, the rotatable adjustment member 55 is mounted to the lower ESSS hard point 50 via the expansion pin 64 extending through the member 55 and a hole, discussed in more detail hereafter, in the lower ESSS hard point 50.

Figure 6:
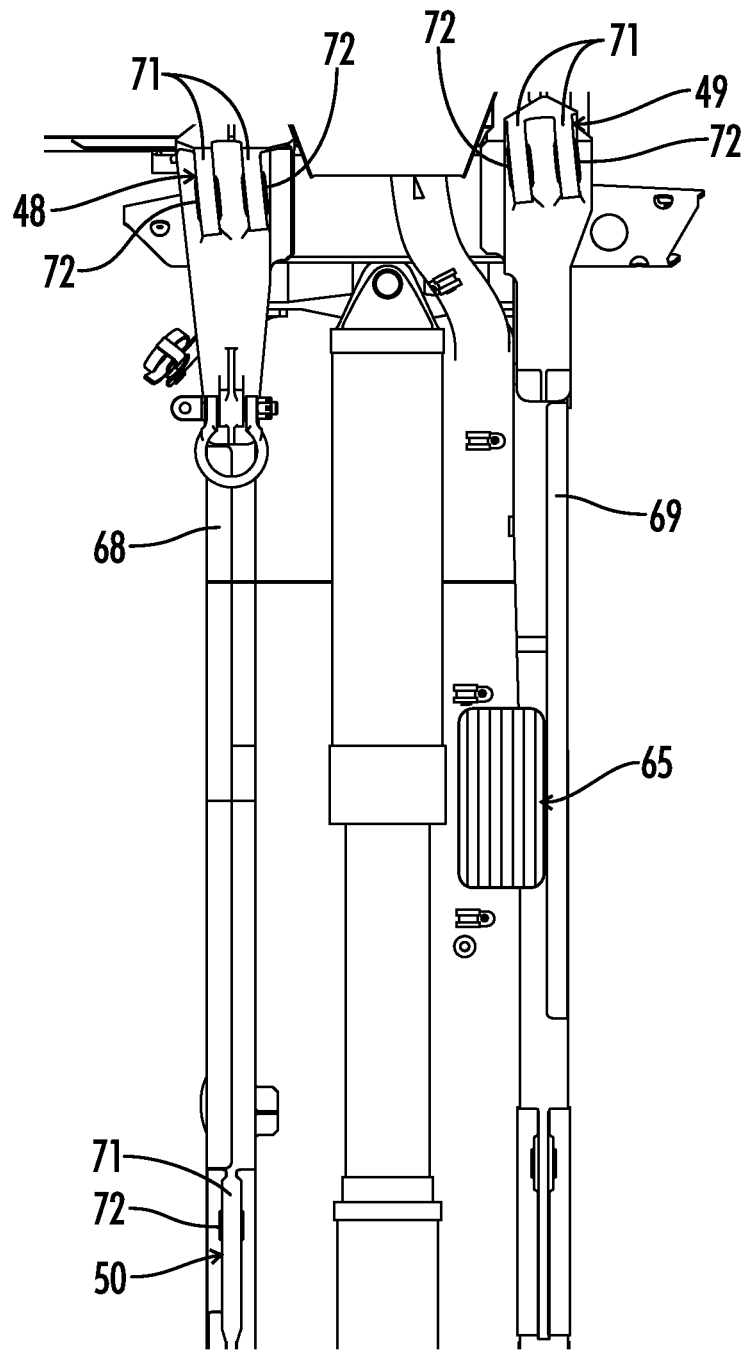
FIG. 6 is a side view of upper and lower ESSS hard points on a vehicle.

FIG. 6 depicts ESSS hard points located on a vehicle 15 used for mounting a hoist arm system 21 on the vehicle 15. ESSS hard points 48, 49, 50 and a folding step 65 are located on the side of the vehicle 15. The upper ESSS hard points 48, 49 are positioned near the tops of frame rails 68, 69 which support the side of the vehicle 15. The lower ESSS hard point 50 is located below the upper ESSS hard point 48 near the bottom of the frame rail 68. The folding step 65 is hingedly connected to the frame rail 69 below the upper ESSS hard point 49. Typically, the folding step 65 is lifted into the horizontal position to facilitate maintenance and is folded down when not in use. The structurally sound upper and lower ESSS hard points 48, 49, 50 are typically used to carry additional fuel tanks or various weapon systems, but they may also be used for mounting an external hoist arm system 21 to the vehicle 15, as described in more detail hereafter. Each hard point 48, 49, 50 has a plurality of tabs 71 extending from the fuselage of the vehicle 15. In other embodiments, other numbers of tabs 71 may be used. Each tab 71 has a hole 72 passing through it for receiving the expansion pin 64.

Figure 7:
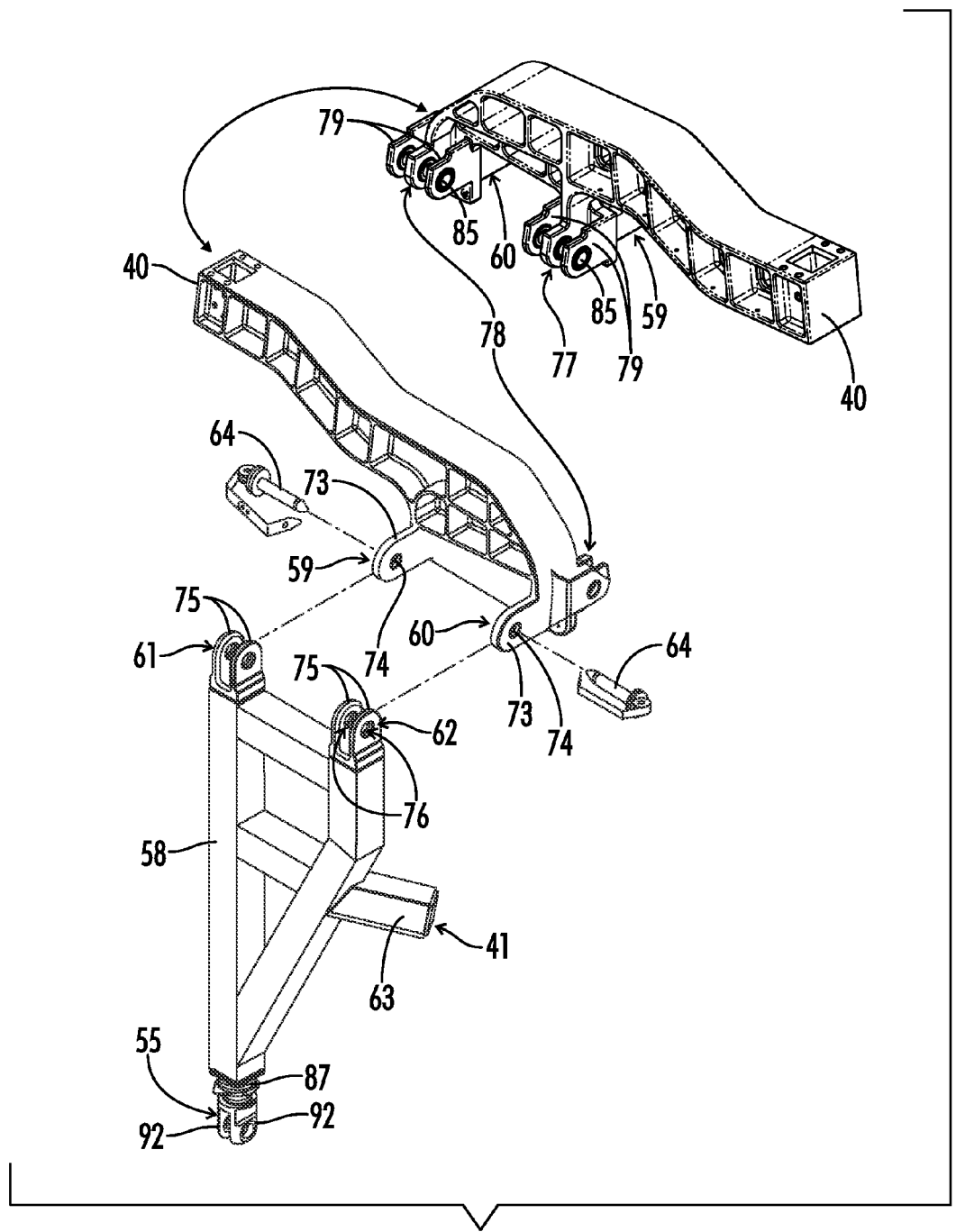
FIG. 7 is an exploded view of the exemplary external hoist arm system of FIG. 3.

FIG. 7 depicts an exploded view of an exemplary hoist arm 40 and support frame assembly 41. As shown in FIG. 7, the hoist arm 40 comprises mounting brackets 59, 60 positioned at the bottom of the hoist arm 40 for engaging with the mounting brackets 61, 62, respectively, located at the top of the support frame assembly 41. Each mounting bracket 59, 60 has at least one tab 73 extending from the arm 40, and each tab 73 has a hole 74 for receiving an expansion pin 64. Similarly, each mounting bracket 61, 62 has a plurality of tabs 75 extending from the support frame 58, with each tab 75 having a hole 76 for receiving an expansion pin 64. The tab 73 of the bracket 59 is positioned between the tabs 75 of the bracket 61 such that the hole 74 is aligned with the holes 76. An expansion pin 64 is then inserted through the holes 74 and 76 in order to secure the arm 40 to the support frame assembly 41. Similarly, the tab 73 of the bracket 60 is positioned between the tabs 75 of the bracket 62 such that the hole 74 is aligned with the holes 76. An expansion pin 64 is inserted through the hole 74 of the bracket 60 and the holes 76 of the bracket 62 in order to secure the arm 40 to the support frame assembly 41. Thus, an expansion pin 64 is used to secure the brackets 59, 61, and another expansion pin 64 is used to secure the brackets 60, 62, thereby securing the arm 40 to the assembly 41.

The hoist arm 40 further comprises hard point mounts 77, 78 for mounting to the upper ESSS hard points 48, 49 (FIG. 3), respectively, of the vehicle 15. Each mount 77, 78 has a plurality of tabs 79, and each tab 79 has a hole 85 for receiving an expansion pin 64. The tabs 71 of the hard point 48 are positioned between the tabs 79 of the mount 77 such that the holes 72 are aligned with the holes 85. An expansion pin 64 is then inserted through the holes 72, 85 in order to secure the mount 77 to the hard point 48. Similarly, the tabs 71 of the hard point 49 are positioned between the tabs 79 of the mount 78 such that the holes 72 are aligned with the holes 85. An expansion pin 64 is inserted through the holes 72, 85 in order to secure the mount 78 to the hard point 49. Thus, an expansion pin 64 is used to secure the mount 77 to the hard point 48, and another expansion pin 64 is used to secure the mount 78 to the hard point 49, thereby securing the arm 40 to the vehicle 15.

Figure 8:
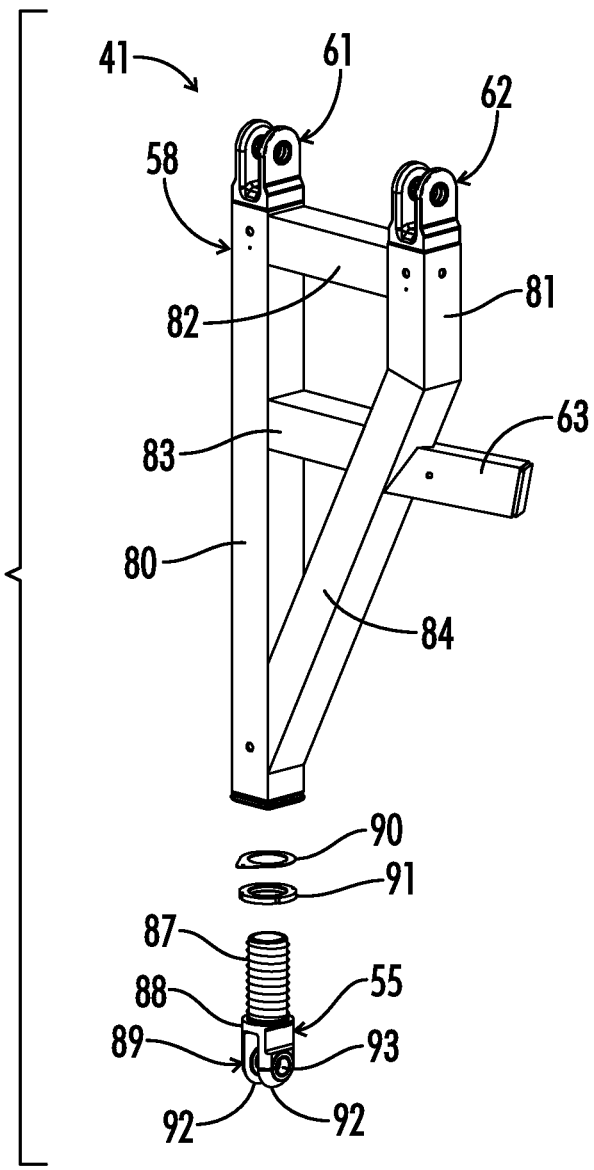
FIG. 8 is an exploded view of the exemplary support frame assembly of FIG. 3.

FIG. 8 depicts an exemplary support frame assembly 41. In one embodiment, the support frame 58 of the assembly 41 comprises five individual pieces of tube stock welded together. In such embodiment, the support frame 58 comprises two vertical members 80, 81, two horizontal members 82, 83, and a diagonal member 84. The vertical member 80 is longer than the vertical member 81. One end of the horizontal member 82 is welded to the side of the vertical member 80 at the top of the vertical member 80, and the other end of the horizontal member 82 is welded to the side of the vertical member 81 at the top of the vertical member 81 such that the vertical members 80, 81 are substantially parallel. The top of the diagonal member 84 is welded to the bottom of the vertical member 81, and the bottom of the diagonal member is welded to the side of the vertical member 80 at the bottom of the vertical member 80. The horizontal member 83 is welded between the side of the vertical member 80 and the side of the diagonal member 84 for added support.

One mounting bracket 61 is mounted to the top of the vertical member 80 and the other mounting bracket 62 is mounted to the top of the vertical member 81. The maintenance step 63 is welded to the back edge of the diagonal member 84 and extends slightly down and away from the diagonal member 84 in order to provide adequate support when the support frame assembly 41 is mounted to the vehicle 15. The rotatable adjustment member 55 comprises a cylindrical neck 87 extending vertically from a collar 88 and a base 89 extending downward from the collar 88. The rotatable adjustment member 55 is configured such that the neck 87 is positioned within a threaded channel at the bottom of the vertical member 80 and the collar 88 prevents over-travel of the neck 87 within the vertical member 80. A washer 90 and a lock nut 91 are positioned around the neck 87. The washer 90 abuts the bottom of the vertical member 80 and the lock nut 91 abuts the bottom of the washer 90.

When rotated, the rotatable adjustment member 55 adjusts the height of the support frame assembly 41, which adjusts the angular position of the hoist arm 40 (FIG. 3) and the hoist 43 (FIG. 3) in relation to the vehicle 15 (FIG. 3). In one exemplary embodiment, the outer surface of the neck 87 and the inner surface of the channel within the vertical member 80 are threaded in order to facilitate height adjustment of the assembly 41, but other techniques of engaging the rotatable adjustment member 55 with the assembly 41 are possible without departing from the scope of the present disclosure. The lock nut 91 locks the support frame assembly 41 in place when the hoist 43 is in the desired position. The base 89 has a plurality of flanges 92 extending downward from the collar 88. Each flange 92 has a hole 93 for receiving an expansion pin 64. When the hoist 43 is properly positioned, the flanges 92 of the rotatable adjustment member 55 are positioned on both sides of the tab 71 of the hard point 50. The holes 93 of the flanges 92 are aligned with the hole 72 of the tab 71, and an expansion pin 64 is inserted through the holes 72, 93 in order to secure the member 55 to the hard point 50. Thus, the hoist arm system 21 is mounted to the vehicle 15 via expansion pins 64 at three hard points 48, 49, 50

Figure 9:
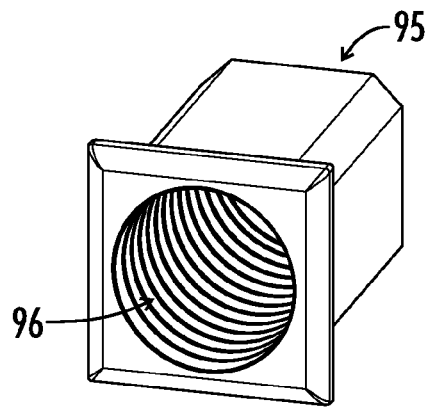
FIG. 9 is a perspective view of an exemplary tube fitting.
Figure 10:
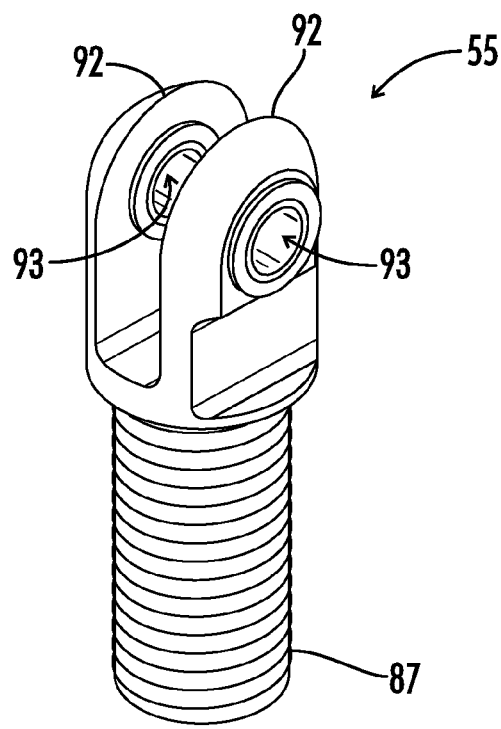
FIG. 10 is a perspective view of an exemplary rotatable adjustment member.

FIG. 9 depicts a tube fitting 95 for engaging with the bottom of the support frame 58. In one embodiment, the tube fitting 95 is configured to be permanently positioned within a channel at the bottom of the vertical member 80 of the support frame 58. A threaded channel 96 extends through the tube fitting 95. The rotatable adjustment member 55, depicted in FIG. 10, has a threaded neck 87 which extends into the threaded channel 96 of the fitting 95. When the rotatable adjustment member 55 is rotated, the threaded neck 87 engages with the threaded channel 96 and the vertical position of the support frame 58 is adjusted up or down in the y-direction based on the direction of rotation. When the vertical position of the support frame 58 is adjusted, the support frame 58 and the hoist arm 40 pivot about the expansion pins 64 and adjust the angular position of the hoist 43 with respect to the vehicle 15. In one embodiment, one full rotation of the member 55 adjusts the angular position of the hoist 43 by approximately one-fourth of an inch with respect to the vehicle, but other rotations-to-distance ratios are possible in other embodiments.

Figure 11:
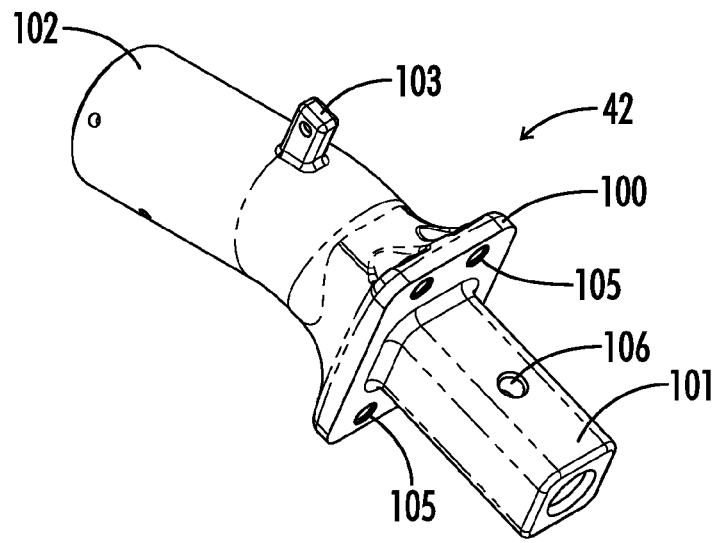
FIG. 11 is a perspective view of an exemplary adapter mount.

FIG. 11 depicts an adapter mount 42. The adapter mount 42 comprises a mounting flange 100, an arm mount 101, a hoist interface 102, and a cable clamp boss 103. The adapter mount 42 is configured to attach the hoist 43 to the hoist arm 40. The arm mount 101 is inserted into the hoist arm 40 and the mounting flange 100 abuts an outer surface of the hoist arm 40. The flange 100 has a plurality of holes 105 for receiving screws (not shown) or other attachment means for securing the mount 42 to the arm 40. The arm mount 101 has one or more holes 106 for reducing the overall weight of the mount 42. The hoist interface 102 extends from the mounting flange 100 and is configured to receive the hoist 43. The cable clamp boss 103 extends from the side of the hoist interface 102 and receives electrical cables extending from the hoist 43 to the computer system 30 of the vehicle 15. Notably, the hoist interface 102 of the adapter mount 42 is compatible with conventional hoists 43 on the market. However, if another hoist 43 with an incompatible interface is used, the adapter mount 42 can simply be replaced without the need to replace the entire hoist arm 40 or hoist arm system 21.

Moreover, the hoist 43 can be removed by sliding the hoist 43 off of the hoist interface 102 of the adapter mount 42 such that the hoist arm system 21 appears as shown in FIG. 5. The hoist 43 can be re-attached by sliding the hoist 43 onto the hoist interface 102 such that the hoist 43 is held by the adapter mount 42, as shown in FIG. 4. Alternatively, another hoist or other device compatible with the mount 42 may be attached to the hoist arm 40 via the mount 42.

In one exemplary embodiment, assume that the vehicle 15 comprises a Black Hawk involved in a SAR mission, and the hoist arm system 21 is mounted to the Black Hawk via expansion pins 64. Also assume that the hoist 43 is mounted to the hoist arm 40 of the hoist arm system 21, and the hoist 43 is coupled to the computer system 30 of the Black Hawk. Furthermore, assume that the neck 87 of the rotatable adjustment member 55 and the inner surface of the support frame 58 are threaded. The angular position of the hoist arm 40 and the hoist 43 are adjusted by rotating the rotatable adjustment member 55. For example, when the adjustment member 55 is rotated in one direction, the neck 87 of the adjustment member 55 rotates to a lower position within the support frame 58, which causes the collar 88 to separate from the frame 58 and raise the vertical position of the frame 58. When the frame 58 is raised, the mounting brackets 61, 62 on top of the frame 58 apply an upward force on the mounting brackets 59, 60 of the hoist arm 40. Such upward force causes the hoist arm 40 to pivot about the expansion pins 64, tilting the arm 40 towards the Black Hawk and decreasing the distance between the hoist 43 and the Black Hawk.

Conversely, when the rotatable adjustment member 55 is rotated in the opposite direction, the neck 87 travels further into the support frame 58 which decreases the vertical position of the frame 58. When the frame 58 is lowered, the mounting brackets 61, 62 of the frame 58 apply a downward force on the mounting brackets 59, 60 of the hoist arm 40. Such downward force causes the arm 40 to pivot about the expansion pins 64, tilting the arm 40 away from the Black Hawk and increasing the distance between the hoist 43 and the Black Hawk. The rotatable adjustment member 55 is rotated in until the hoist 43 is in a desirable position with respect to the Black Hawk.

Figure 12:
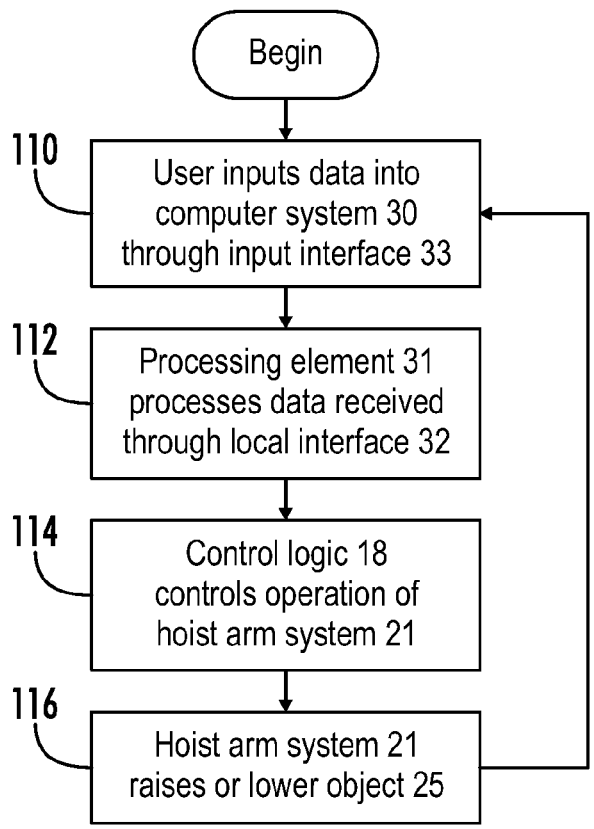
FIG. 12 is a flowchart illustrating an exemplary operation of the hoisting system of FIG. 1.

Once the hoist arm 40 and hoist 43 are positioned properly with respect to the Black Hawk, a user of the Black Hawk inputs data into the computer system 30 through the input interface 33, as shown by block 110 of FIG. 12. The processing element 31 receives the data through the local interface 32 and then processes the data, as shown by block 112. The control logic 18 controls the operation of the hoist arm system 21 based on the processed data, as shown by block 114, which results in the hoist arm system 21 raising and lowering objects 25, shown by block 116. Notably, in SAR missions, the objects 25 raised and lowered by the hoist arm system 21 may be people, supplies, or other types of objects.

Now, therefore, the following is claimed:

1. An aerial vehicle, comprising:
a fuselage having a door and a leading end;
a first hard point positioned on the fuselage and adjacent to the door between the door and the leading end of the fuselage;
a second hard point positioned on the fuselage and adjacent to the door between the door and the leading end of the fuselage;
a third hard point positioned on the fuselage and adjacent to the door between the door and the leading end of the fuselage;
a hoist system comprising:
   a support frame assembly mounted on the first, second, and third hard points, the support frame assembly having a support frame and a rotatable adjustment member coupled between the support frame and the third hard point;
   a hoist arm coupled to the support frame assembly; and
   a hoist having a hoisting cable, the hoist coupled to the hoist arm such that the hoist cable is aligned with a doorway for the door.

2. The aerial vehicle of claim 1, wherein the hoist is positioned above the doorway.

3. The aerial vehicle of claim 1, wherein the hoist arm is mounted on the first hard point.

4. The aerial vehicle of claim 1, wherein the support frame assembly further comprises a step extending from the support frame.

5. The aerial vehicle of claim 1, wherein the rotatable adjustment member has a threaded neck inserted into a threaded channel of the support frame.

6. The aerial vehicle of claim 1, wherein rotation of the rotatable adjustment member moves the hoist relative to the fuselage.

7. The aerial vehicle of claim 6, wherein the support frame has a mounting bracket, wherein the mounting bracket has a hole, and wherein a pin passes through the hole and the first hard point.

8. The aerial vehicle of claim 7, wherein the rotation of the rotatable adjustment member causes the support frame to pivot about the pin.

9. The aerial vehicle of claim 8, wherein the arm has a tab, and wherein the pin passes through the tab.

10. An aerial vehicle, comprising:
a fuselage;
a first hard point positioned on an exterior of the fuselage;
a second hard point positioned on the exterior of the fuselage;
a third hard point positioned on the exterior of the fuselage;
a hoist system comprising:
   a support frame assembly mounted on the first, second, and third hard points, the support frame assembly having a support frame;
   a hoist arm mounted on the first and second hard points;
   a first pin passing through the first hard point and a mounting bracket of the support frame; and
   a hoist coupled to the hoist arm,
   wherein the support frame is configured to pivot about the first pin thereby causing the hoist to move relative to the fuselage.

11. The aerial vehicle of claim 10, wherein the hoist is coupled to the hoist arm such that a hoist cable of the hoist is aligned with a doorway of the fuselage.

12. The aerial vehicle of claim 10, wherein the support frame assembly has a rotatable adjustment member coupled between the support frame and the third hard point, and wherein rotation of the rotatable adjustment member causes the support frame to pivot about the first pin.

13. The aerial vehicle of claim 10, wherein the hoist system further comprises a second pin passing through the second hard point and a mounting bracket of the support frame, and wherein the support frame is configured to pivot about the second pin.

* * * * *